(12) United States Patent
Moisio et al.

(10) Patent No.: US 8,027,281 B2
(45) Date of Patent: Sep. 27, 2011

(54) ADAPTIVE ASSOCIATED CONTROL CHANNEL MESSAGING

(75) Inventors: Martti Moisio, Haarajoki (FI); Benoist Sébire, Tokyo (JP)

(73) Assignee: Spyder Navigations L.L.C., Wilmington, DE (US)

( * ) Notice: Subject to any disclaimer, the term of this patent is extended or adjusted under 35 U.S.C. 154(b) by 1024 days.

(21) Appl. No.: 11/547,839

(22) PCT Filed: Apr. 16, 2004

(86) PCT No.: PCT/FI2004/000237
§ 371 (c)(1),
(2), (4) Date: Oct. 5, 2006

(87) PCT Pub. No.: WO2005/101715
PCT Pub. Date: Oct. 27, 2005

(65) Prior Publication Data
US 2007/0230379 A1    Oct. 4, 2007

(51) Int. Cl.
*H04B 7/00*    (2006.01)

(52) U.S. Cl. ......... 370/310; 704/221; 704/226; 704/229

(58) Field of Classification Search .................. 370/294
See application file for complete search history.

(56) References Cited

U.S. PATENT DOCUMENTS

| 5,960,354 | A  | * | 9/1999  | Einola ........................... 455/454 |
| 6,539,205 | B1 | * | 3/2003  | Wan et al. ....................... 370/465 |
| 6,813,252 | B2 | * | 11/2004 | Chang et al. .................. 370/294 |
| 7,010,001 | B2 | * | 3/2006  | Odenwalder ................. 370/476 |
| 7,315,814 | B2 | * | 1/2008  | Vainio et al. .................. 704/221 |
| 2002/0114284 | A1 |   | 8/2002  | Kronestedt et al. |
| 2005/0143123 | A1 | * | 6/2005  | Black et al. ................ 455/552.1 |
| 2006/0104204 | A1 | * | 5/2006  | Hansson et al. ............... 370/235 |

FOREIGN PATENT DOCUMENTS

WO    WO 02056609    7/2002

* cited by examiner

*Primary Examiner* — Charles Appiah
*Assistant Examiner* — Natasha Cosme

(57) ABSTRACT

An optional short SACCH is used when the network detects high error rate in the normal SACCH channel. The communication returns to normal mode when the network detects that the link quality has improved. In the short SACCH message only the most relevant information fields are sent. The extra bits are used for channel coding so that in the channel conditions where the most robust AMR codings still work, the BLER of short SACCH is still tolerable.

53 Claims, 7 Drawing Sheets

ADAPTIVE ASSOCIATED CONTROL CHANNEL MESSAGING

CROSS REFERENCE TO RELATED APPLICATIONS

This application is for entry into the U.S. national phase under §371 for International Application No. PCT/FI2004/000237 having an international filing date of Apr. 16, 2004, and from which priority is claimed under all applicable sections of Title 35 of the United States Code including, but not limited to, Sections 120, 363 and 365(c).

FIELD

An embodiment concerns a wireless cellular mobile station configured to operate under adaptive multi-rate coding for establishing a connection based on the adaptive multi-rate coding between the wireless cellular mobile station and a wireless cellular mobile network. Furthermore, another embodiment concerns a receiver for receiving a wireless cellular mobile signal, which receiver is configured to operate under adaptive multi-rate coding for establishing a connection based on the adaptive multi-rate coding between the wireless cellular mobile station and a wireless cellular mobile network. Still furthermore, another embodiment concerns a sub-assembly configured to operate under adaptive multi-rate coding for establishing a connection based on the adaptive multi-rate coding between a wireless cellular mobile station having said sub-assembly and a wireless cellular mobile network. Still furthermore, another embodiment concerns a chipset configured to operate under adaptive multi-rate coding for establishing a connection based on the adaptive multi-rate coding between a wireless cellular mobile station having said chipset and a wireless cellular mobile network. Still furthermore, another embodiment concerns a wireless cellular mobile network entity configured to operate under adaptive multi-rate coding for establishing a connection based on the adaptive multi-rate coding between the wireless cellular mobile network entity and a wireless cellular mobile station. Also, an embodiment concerns the use and a system of such apparatuses.

BACKGROUND ART

Currently, in networks adapted to operate under adaptive multi-rate (AMR) speech coding having at least one codec having a robust coding, the spectrum efficiency and capacity requirements are high. In particular, the above requirements are highlighted when there are many terminals using the network. For speech, the introduction of the robust coding makes it possible to tighten the network reuse. Furthermore, the robust codec allows the network to operate at very low Carrier-to-Interference Ration (CIR) values. The communication comprises the Traffic Channel (TCH) and the associated control channel (ACCH). Nevertheless, the ACCH are kept the same although robust coding in TCH is applied. In a high capacity robust coding based network, the CIR values can be occasionally low (e.g. few dBs). However, at this level the associated control channel error rates are really disturbing resulting in rectification actions in the network.

Such a known technique is disclosed the current GSM/EDGE Radio Access Networks (GERAN networks). I.e. in GERAN networks the spectrum efficiency and capacity requirements are very high. For speech, the introduction of AMR (Adaptive Multi-rate) makes it possible to tighten the network reuse to unprecedented level. AMR has very robust codecs (e.g. AMR4.75, AMR5.9) that allow the network to operate at very low CIR values. However, when AMR was standardized, the associated control channels were kept the same. Examples of the associated control channels are Slow Associated Control Channel (SACCH) and Fast Associated Control Channel (FACCH)) in GERAN. In a high-capacity AMR network, the CIR values can be occasionally very low (only few dBs). For example, AMR4.75 can reach 1% Frame Error Rate with only CIR of 2.6 dB. However, at this level the SACCH and FACCH error rates are around 50%.

Failed SACCH decoding(s) will cause the call to be dropped, based on RADIO_LINK_TIMEOUT parameter. Failed SACCH and FACCH decoding(s) cause also problems with L3-layer signaling, measurement reports and RRM algorithms (handover, power control).

Hence, the bottleneck and a clear drawback for network capacity will often be the associated control channels.

SUMMARY

It is therefore an object to provide a wireless cellular mobile station, a receiver, a sub-assembly, a chipset and a wireless cellular network entity to improve the associated control channel (ACCH) performance whenever needed.

An embodiment utilizes an adaptive (i.e. optional) ACCH message, which comprises a portion of bits allocated for the channel coding for making the connection more robust, thereby enabling flexibly (i.e. adaptively) to follow the AMR coding of the service connection. Thus, the embodiment uses intelligence in the messaging so that more robust signaling channels can be used that furthermore prevent the mobiles to be dropped. Therefore the embodiment can lead to higher capacity of the network. The network can more fully utilize the traffic channel (TCH) capacity it has. Dropping of calls is more due to the errors on TCH channels not with respect to errors in the associated control channel.

In the further embodiments, an optional truncated or short ACCH message is used when the network detects high error rate in the normal ACCH channel. The communication returns to normal mode when the network detects that the link quality has improved. In the short ACCH message only some relevant information fields are sent. The extra bits of the ACCH message are used for channel coding so that in the channel conditions, where the robust codings still work, the Block Error Rate (BLER) of the truncated ACCH is still tolerable. In another further embodiment, the duty cycle of conventional ACCH can be slowed down.

Further embodiments can utilize information that not all the fields in the associated control channel message are time-critical. In current system, all the associated control channel messages can have high error rate and delay. It is advantageous to focus on the relevant and time critical associated control channel messages that have low error rate and delay, while non-urgent and less important messages can be delayed or sent less frequently. Thus, the further embodiments can be based on possibilities when bad channel condition occur that not all the fields carried in ACCH messages may be needed or that the duty cycle of ACCH can be slowed down. Furthermore, both further embodiments can be mixed.

Thus, the further embodiments solve the ACCH channel performance problem. The embodiments are cheap and easy to implement into Base Station Sub-system (BSS) and Mobile Station (MS). Furthermore, the embodiments are backward compatible and do not disturb the legacy networks or mobiles.

Yet further embodiments have been specified in the dependent claims.

BRIEF DESCRIPTION OF THE DRAWINGS

An embodiment will now be described, by way of examples only, with reference to the accompanying drawings, in which.

DESCRIPTION OF FURTHER EMBODIMENTS

Further embodiments present a method for signaling and algorithm to be used in a cellular network and the mobile station, using GSM/EDGE network as an example. By using intelligence in the network, more robust signaling channels can be used that prevent the mobiles to be dropped, thus leading too much higher capacity of the network. The further embodiments improve the SACCH channel performance in wireless cellular mobile network such as GERAN. In this description, GERAN network and SACCH is used as an example.

Further embodiments utilize the fact that not all the fields in the SACCH messages are time-critical. In current system, all the SACCH messages can have very high error rate and delay. It is much better for the system that the important and time-critical SACCH messages have very low error rate and delay, while the non-urgent and less important messages are delayed or sent less frequently. Thus, the further embodiments can be based on possibilities when bad channel condition occur that 1) not all the fields carried in SACCH messages may be needed or 2) that the duty cycle of SACCH can be slowed down. Furthermore, some further embodiments can mix both.

In yet some further embodiments, an optional short SACCH is used when the network detects high error rate in the normal SACCH channel. The communication returns to normal mode when the network detects that the link quality has improved. In the short SACCH message only the most relevant information fields are sent. The extra bits are used for channel coding so that in the channel conditions where the most robust AMR codings still work, the BLER of short SACCH is still tolerable. In further embodiments, the duty cycle of conventional SACCH can be slowed down.

Thus, in a further embodiment a short SACCH is used where only the most relevant information fields are sent. The extra bits are used for channel coding so that in the channel conditions where the most robust AMR codings still work, the BLER of short SACCH is still tolerable.

In another further embodiments a slow SACCH is used where the duty cycle of the SACCH is decreased to 960 ms, allowing for twice more channel coding In still another further embodiment the combination of the short and the slow SACCH is used for best link level performance of the SACCH Basically whenever the network detects high error rate in the normal SACCH channel, it enters a rescue mode where new kind of SACCH is used. The communication returns to normal mode once the network detects that the link quality has improved.

The selection/switching and corresponding use between the modes (i.e. the optional short ACCH and normal ACCH) can be applied independently for downlink and uplink directions.

Various Uplink Based Further Embodiments

Figure 1:
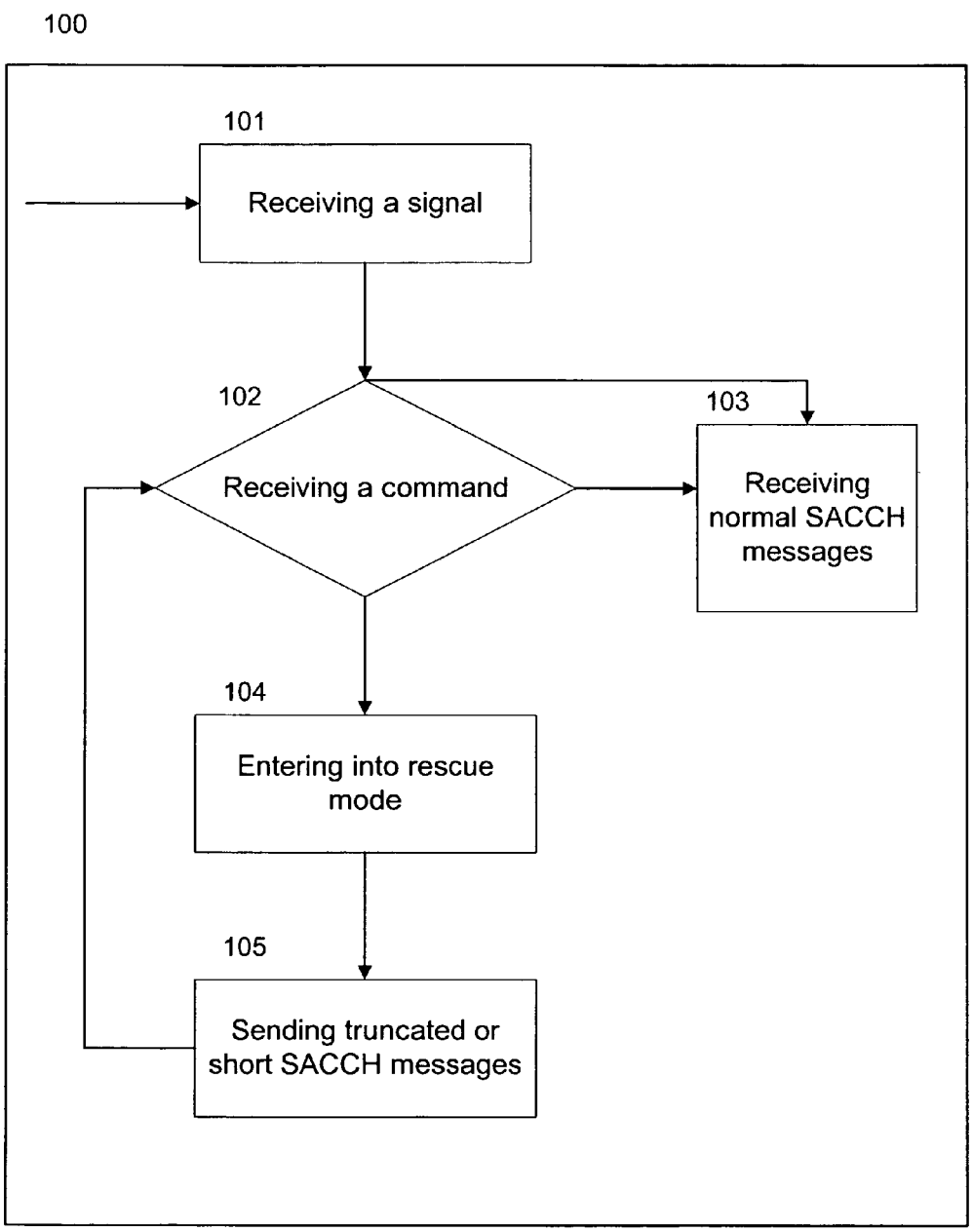
FIG. 1 depicts a partial functional block diagram for a wireless cellular mobile station in accordance with a further embodiment of the invention.

Referring to a further embodiment of FIG. 1, a wireless cellular mobile station (MS) 100 is depicted. In FIG. 1 some portions of the mobile station (MS) 100 are depicted comprising functional block therein, and for the sake of clarity some other parts of the mobile are omitted. The functional block may be adapted to perform the corresponding use/process of the mobile. MS 100 comprises means (module) 101 for receiving a signal. MS 100 comprises means (module) 102 for receiving a command from a wireless cellular mobile network. The command can be extracted from the received data. The command indicates the MS 100 to enter into a rescue mode. Furthermore, the command or an absence of such a command can indicate the MS 100 that a normal SACCH mode should be used.

Thus, the rescue mode can be activated on uplink. The network commands the MS 100 to start sending truncated SACCH messages instead of normal ones.

Referring back to FIG. 1, the MS 100 comprises means (module) 103 for receiving normal SACCH messages, thereby being in the normal SACCH mode. The MS 100 comprises furthermore means (module) 104 for entering into the rescue. The rescue mode is entered in FIG. 1, if the respective command has been received. Accordingly MS 100 comprises means (module) 105 for sending truncated or short SACCH message(s). The truncated SACCH messages can be send instead of the normal SACCH messages. Furthermore, the MS 100 may switch between the normal mode of 103 and the truncated mode of 105 by receiving a further command from the network any time.

Figure 2:
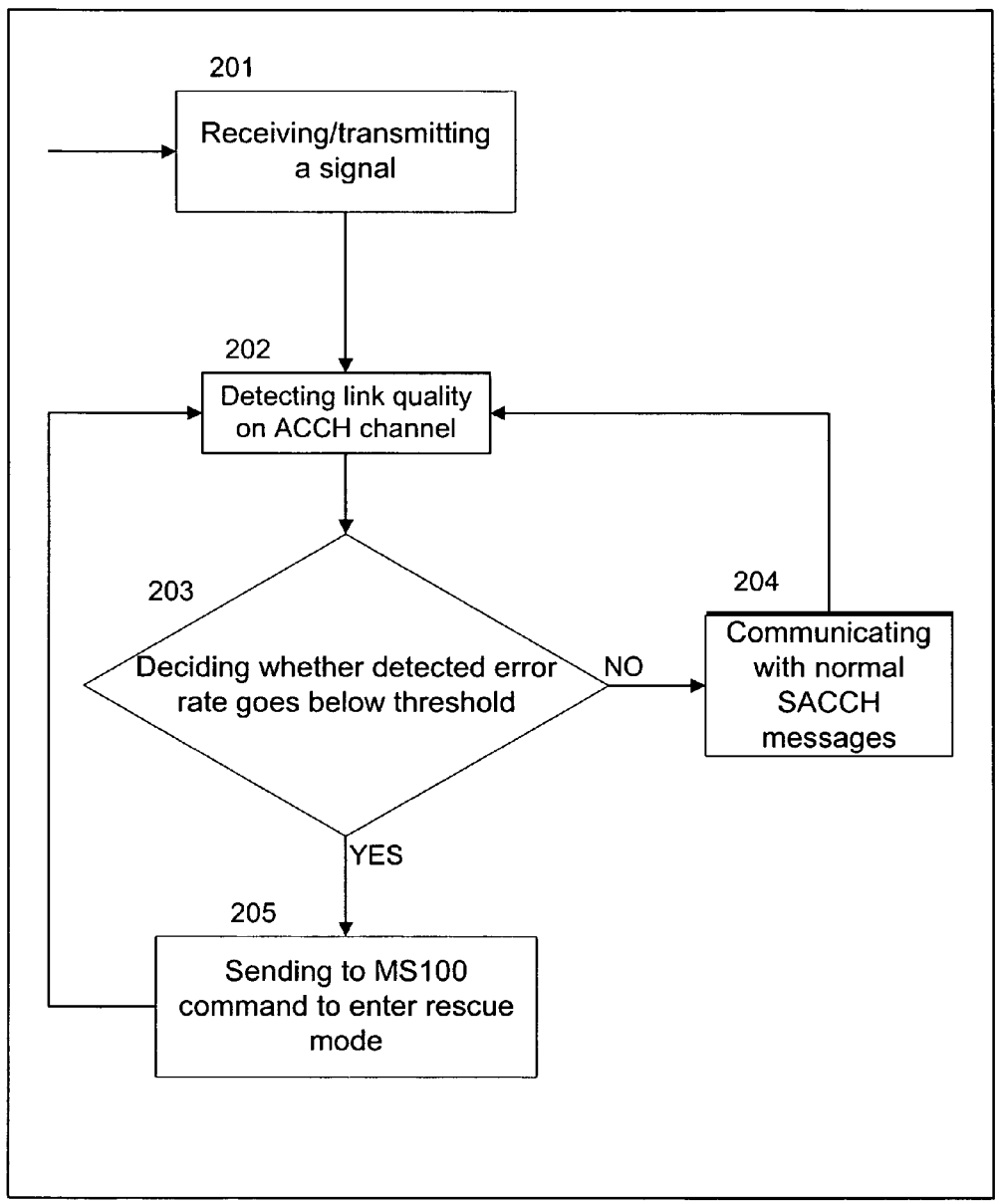
FIG. 2 depicts a partial functional block diagram for a wireless cellular mobile network entity in accordance with another further embodiment of the invention.

Referring to a further embodiment of FIG. 2, a wireless cellular mobile network entity (NE) 200 is depicted. In FIG. 2 some portions of NE 200 are depicted comprising functional block therein, and for the sake of clarity some other parts of the mobile are omitted. The functional block may be adapted to perform the corresponding use/process of the network entity. NE 200 of FIG. 2 depicts a further embodiment on the uplink connection. NE 200 comprises means (module) 201 for receiving/transmitting a signal. NE 200 comprises also means (module) 202 for detecting a link quality on ACCH channel.

In further embodiments, the network entity comprises means for detecting high error rate in the normal SACCH channel. The network or the network entity detects high SACCH BLER, for example when the radio link counter S (incorporate herein as a reference from technical specification: 3GPP TS 05.08, section Radio Link Failure) goes below a certain threshold (e.g. RESCUE_LEVEL_S). Furthermore, a Base Station Sub-system (BSS) can be configured to evaluate the contents of the each short SACCH message. Another further embodiment can be based detecting the reported RXQUAL going above a certain threshold. Still another further embodiment can be that the command mode request of AMR link adaptation signaling going below a certain threshold. Thus, in all these further embodiments, the network is indicated to enter the rescue mode.

Referring back to FIG. 2, NE 200 further comprises means (module) 203 for deciding whether the detected error rate goes below a certain threshold. The network, in particularly, NE 200, makes the decision on the uplink communication. Based on the detected link quality ACCH channel, the NE 200 is configured to decide on the applied communication mode on the ACCH channel. Thus, whether to use the normal ACCH mode or optional truncated ACCH mode.

Still referring to FIG. 2, NE 200 has means (module) 204 for communicating with normal SACCH messages. For example, NE 200 can receive SACCH message. The normal SACCH messaging mode is selected if the BLER of SACCH channel has not been high enough. In further embodiments, a benefit for the normal mode can be that the SACCH messaging is complete. Thus each message gives full information.

Still referring to FIG. 2, NE 200 has also means (module) 205 for sending a command to enter rescue mode to MS 100. The NE 200 sends the command to MS 100 to enter into the rescue mode, i.e. to start sending the optional short SACCH messages. Thus the network command the MS 100 to start sending short SACCH messages instead of normal ones, i.e. the rescue mode is activated by the NE 200.

The further embodiment of FIG. 2 can co-operate with the further embodiment of FIG. 1.

Figure 3:
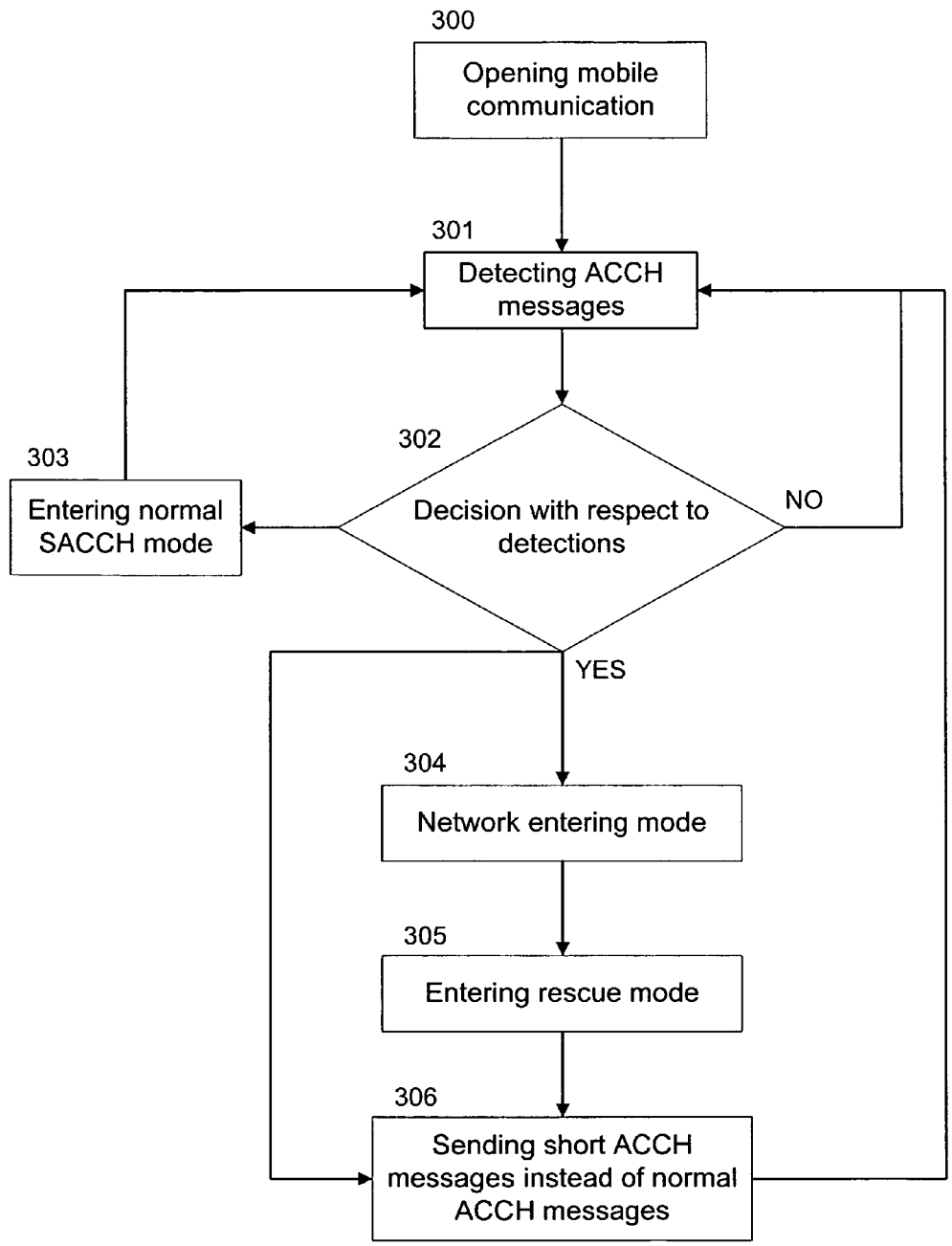
FIG. 3 depicts a process flowchart for an uplink procedure in accordance with yet another further embodiment of the invention.

Referring to a further embodiment of FIG. 3, a process for uplink procedure is depicted. The further embodiments of FIG. 1 MS 100 and FIG. 2 NE 200 can co-operate to perform the example of FIG. 3. The process starts by opening the mobile communication (300). Next there is the detection of the ACCH messages (301) and the decision with respect to the detection (302).

In further embodiments, the network detects high error rate in normal SACCH channel. When the network detects high SACCH BLER, for example when the radio link counter S (see the incorporated reference to the specification: 3GPP TS 05.08, section Radio Link Failure) goes below certain threshold (RESCUE_LEVEL_S), the network enters the Rescue Mode (304). Also another further embodiment can be based detecting the reported RXQUAL going above a certain threshold. Still another further embodiment can be that the command mode request of AMR link adaptation signaling going below a certain threshold. Thus, in all these further embodiments, the network is indicated to enter the rescue mode.

Referring back to FIG. 3, if the error rate is tolerable, the normal ACCH mode is used (303). For example, the communication uses normal SACCH messages. Referring to the step 304, the network enters mode. The network commands MS 100. The network sends the command to MS 100 to enter the rescue mode 305, i.e. to start sending short ACCH messages instead of normal ones. The MS 100 starts sending the short ACCH messages instead of the normal ACCH messages 306.

If the MS (or Base Station BS) is in the rescue mode, the network, for example BSS, evaluates the contents of each short SACCH message. Thereby the process can switch between the modes online depending on the state of the transmission, the channel condition(s) and the applied AMR coding mode in the traffic channel. Furthermore, the process may stick in the either one of the modes as long as it is required, i.e. the threshold condition is not changes.

Various Downlink Based Further Embodiments

Figure 4:
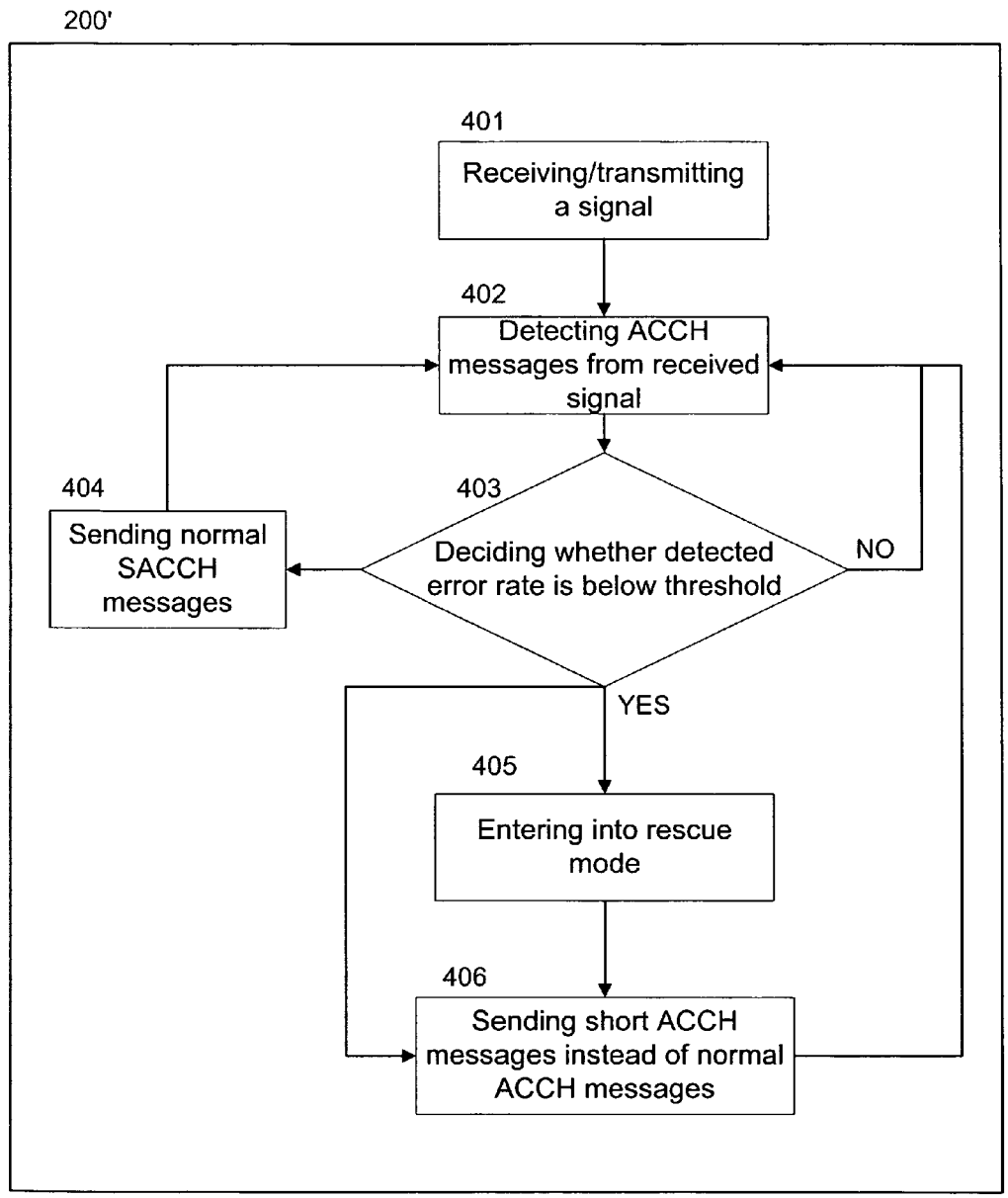
FIG. 4 depicts a partial functional block diagram for a wireless cellular mobile network entity in accordance with yet another further embodiment of the invention, FIG. 5 depict a general process flowchart for a system procedure in accordance with yet another further embodiment of the invention.

Referring to a further embodiment of FIG. 4, a wireless cellular mobile network entity (EN) 200' is depicted. In FIG. 4 some portions of NE 200' are depicted comprising functional block therein, and for the sake of clarity some other parts of the mobile are omitted. The functional block may be adapted to perform the corresponding use/process of the entity. NE 200' comprises means (module) 401 for receiving/transmitting a signal. NE 200' comprises means (module) 402 for detecting ACCH messages from the received signal. NE 200' can detect SACCH messages.

In further embodiments, the network entity comprises means for detecting high error rate in the normal SACCH channel. The network or the network entity detects high SACCH BLER, for example when the radio link counter S (incorporate herein as a reference from technical specification: 3GPP TS 05.08, section Radio Link Failure) goes below a certain threshold (e.g. RESCUE_LEVEL_S). Furthermore, a Base Station Subsystem (BSS) can be configured to evaluate the contents of the each short SACCH massage. Also another further embodiment can be based detecting the reported RXQUAL going above a certain threshold. Still another further embodiment can be that the command mode request of AMR link adaptation signaling going below a certain threshold. Thus, in all these further embodiments, the network is indicated to enter the rescue mode.

Referring back to FIG. 4, NE 200' further comprises means (module) 403 for deciding whether the detected error rate goes below a certain threshold. The network, in particularly, the NE 200' makes the decision on the downlink communication. Based on the detected link quality ACCH channel, the NE 200' is configured to decide on the applied communication mode on the ACCH channel. Thus, whether to use the normal ACCH mode or optional truncated ACCH mode.

Still referring to FIG. 4, NE 200' has means (module) 404 for sending normal SACCH messages. The normal SACCH messaging mode is selected if the BLER of SACCH channel has not been high enough. In further embodiments, a benefit for the normal mode can be that the SACCH messaging is complete. Thus each message gives full information.

Furthermore, NE 200' has means (module) 405 for entering the rescue mode. Accordingly, NE 200' start sending short ACCH messages instead of the normal ACCH by using means (module) 406. For example, if the rescue mode is activated on downlink, the BSS starts sending short SACCH messages instead of normal ones.

NE 200' can continuously evaluate the contents of the ACCH messages, thereby being capable of switching the mode between the normal and shorter ACCH message modes. Furthermore, NE 200' can maintain the mode as long as it is required, i.e. the threshold indicator has not indicated the change.

Generally in uplink or downlink further embodiment, if either the MS 100 or NE 200 or NE 200' is in the rescue mode, the network (for example, BSS) evaluates the contents of each short SACCH message.

Figure 5:
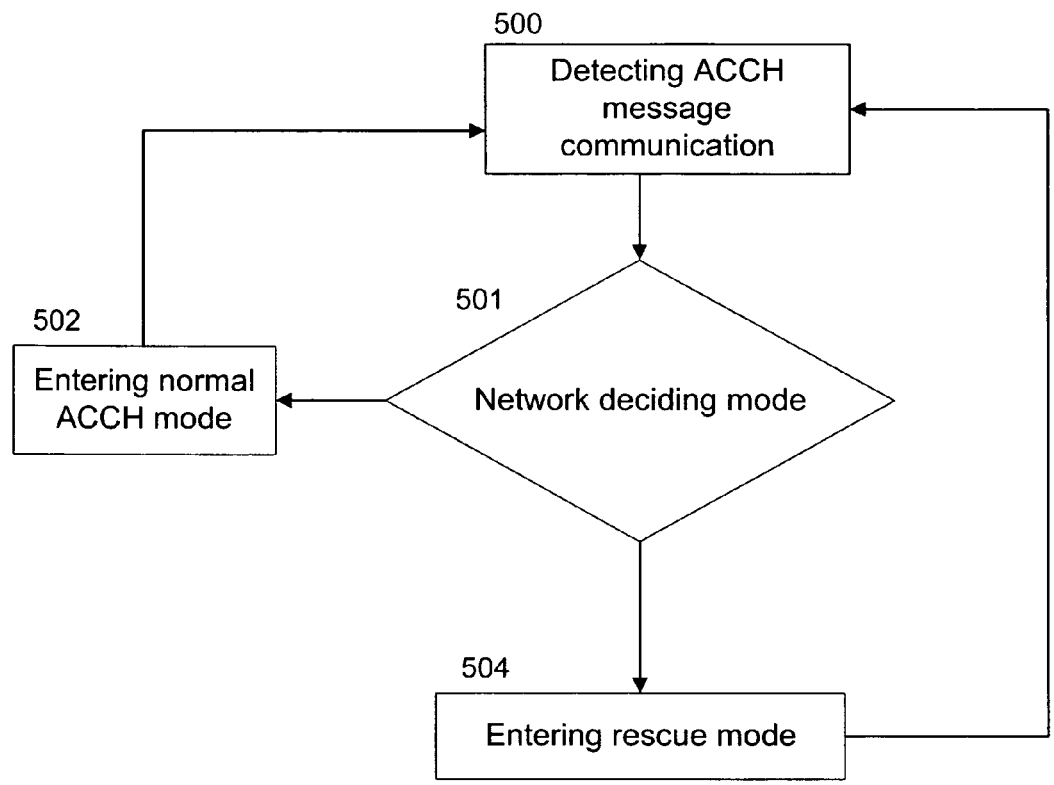

Referring to a further embodiment of FIG. 5 depicting a general procedure for uplink or downlink adaptive signaling for control channel. The network detects the ACCH message communication 500. For example, the BSS detects the SACCH messages between the MS 100 and the network. Accordingly, the network decides the mode 501. There can be two modes for ACCH messages: the normal ACCH mode 502 and the rescue mode 504. Thus, the associated control channel message can be adaptive for error correction in such a way that the two options exists. Furthermore, the ACCH message is adaptive so that it can follow the AMR coding of the TCH. Furthermore, the ACCH message can be adaptive for flexibly taking into account the channel condition. Thus, the network can detect the conditions of the ACCH channel communications for finding out BLER of the ACCH channel. Therefore, the adaptive ACCH message can contain some part for coding for making the channel coding more robust based on the detected channel conditions.

Furthermore, the process loop can be continuously evaluated, thereby the mode is switchable between the two modes. The switching may depend on the detected BLER in the ACCH channel and/or the used AMR mode.

Various Further Embodiments Using Truncated ACCH Message

Various further embodiments can use the truncated (or alternatively referred to as the short) ACCH message. An example of such a short message is short SACCH message. The sort SACCH message can be of fixed length. For example, it can contain 84 information bits instead of 184 in the normal SACCH. This would results into coding rate of around ¼ instead of ½. Therefore the BLER performance would hence be about the same level as the most robust AMR codecs has. In short SACCH messages, only a subset of the information usually sent in normal SACCH messages are sent. In the DL, for instance, the PC information can be omitted as it is very likely that during the whole RESCUE_SACCH procedure, the maximum output power will be used in the MS 100 anyway. Also in the DL, it may not be necessary to send the L2 frame at all (System Information 5, 6, 5bis, 5ter and L2 fill frames may be omitted during the RESCUE_SACCH procedures). In the UL, not all neighboring cells are reported in the measurement reports and enhanced measurement reports. For instance, only the 2 strongest cells are reported instead of 6 in measurement reports.

Various Embodied Further Implementations

For the sake of clarity, there is being referred directly to the rescue mode. However, the embodied further implementations do not limit to these further options, and neither do they necessarily deviate from the other means of the invention.

In various further embodiments in the rescue mode, there is being sent the short SACCH instead of normal SACCH. The duty cycle will be the same as normally: SACCH block is received every 480 ms. This can have options such as:

A first option, a fixed message content is used for short SACCH.

A second option, the network can decide what information fields are sent in the short SACCH message. In this case, a separate information (header) field is needed to tell the contents of the message. As an example, 3 bits can be used to separate 8 different short SACCH message contents. Based on urgency, time delay from last successful message, and other relevant factors, the network selects the most suitable message content for each short SACCH.

In yet various further embodiments for implementation for the rescue mode, the whole SACCH message is sent. However, the whole SACCH message is encoded over 2 (or more) normal SACCH periods. In this case, the number of information bits in one decoded SACCH message remains the same, but the duty cycle is twice (or more). Effectively, the receiver would decode SACCH only in every N×480 ms. The extra bits are used for error correction. These further embodiments can be referred to as slow SACCH. The content of SACCH messages can be left unchanged but the channel coding is performed over 8 bursts instead of 4 as currently specified in 3GPP TS 45.003. As a result, the coding rate is twice lower and the duty cycle is twice slower leading to an improved but slower SACCH.

Furthermore, the short and the slow SACCH can be combined for very good link level performance.

In further embodiments the network is in charge of activating the RESCUE_MODE. It can be done via L3 signaling through FACCH or preferably via the stealing bits of the 4 SACCH bursts:

| | |
|---|---|
| 00 00 00 00 | RESCUE_MODE not activated = normal mode |
| 11 11 11 11 | RESCUE_MODE activated |

In some further embodiments, although three options are listed for the SACCH during RESCUE_MODE, only one should be use.

If all options were to coexist, they could be signaled via
  stealing bits of the SACCH: one combination for normal mode, one combination for RESCUE_MODE with Short SACCH, one combination for RESCUE_MODE with Slow SACCH, and one combination for RESCUE_MODE with Slow & Short SACCH.
L3 signaling when starting the RESCUE_MODE.
within the SACCH itself where a separate header is used for signaling the type of SACCH.

Additionally, there could be several kinds of Short SACCH and Slow & Short SACCH where different lengths of the SACCH messages are allowed. Again this could be signaled via the stealing bits or via a separate header. As an example, 3 bits could be used to separate 8 different short SACCH message contents. Based on urgency, time delay from last successful message, and other relevant factors, the network selects the most suitable message content for each short SACCH.

Figure 6:
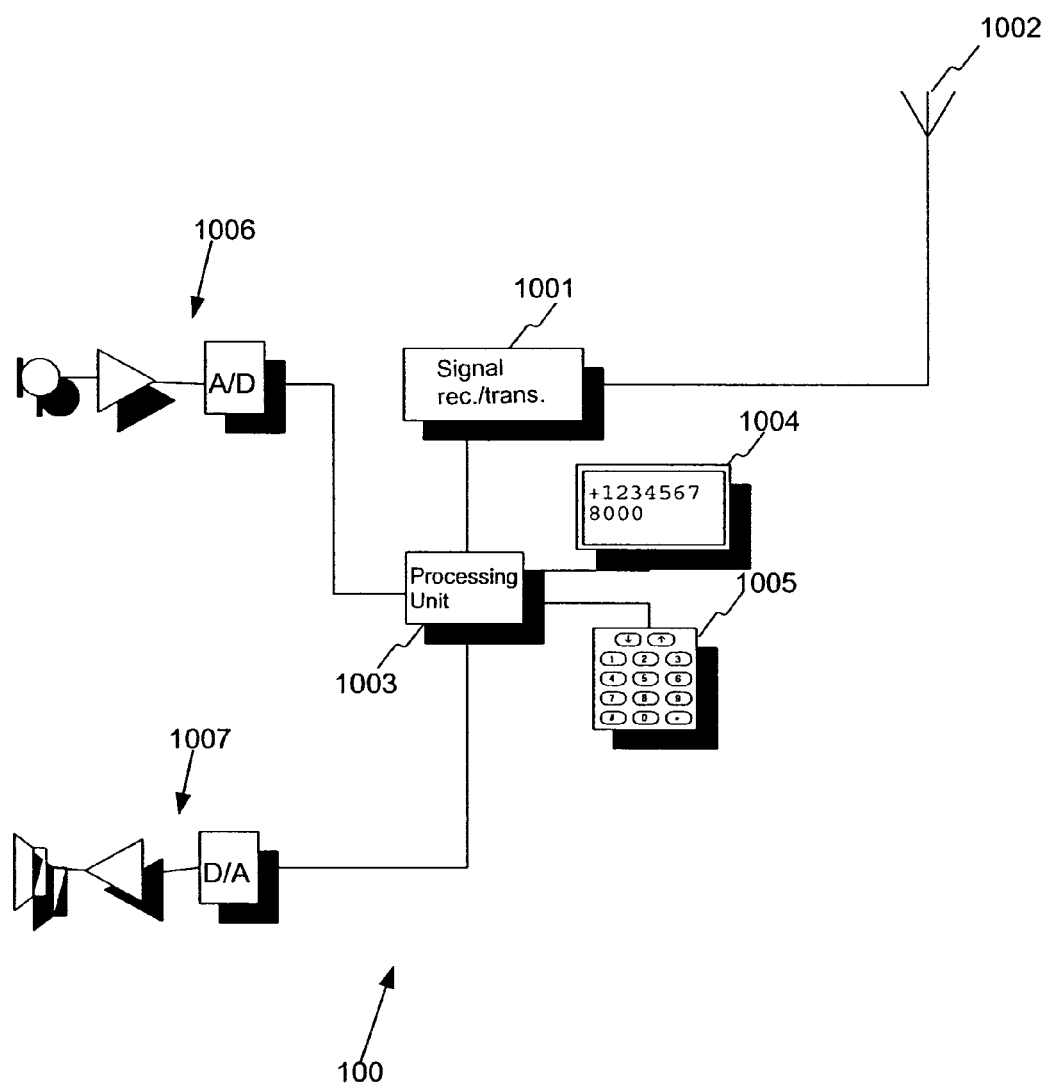
FIG. 6 depicts a general simplified block diagram of a wireless cellular mobile station in accordance with further embodiments of the invention.

Referring to FIG. 6 a more general functional block diagram of the wireless cellular mobile station 100 is shown. The illustrated MS 100 may be used in any or all of the various embodiments. The receiver comprises a processing unit 1003, a signal receiver/transmitter part 1001 such as GSM receiver/transmitter and a user interface (UI). The user interface comprises a display 1004 and a keyboard 1005. In addition, the UI comprises an audio input 1006, and audio output 1007. The processing unit 1003 comprises a microprocessor (not shown), possibly a memory (not shown) and software (not shown) or controllable logic. The processing unit 1003 controls, on the basis of the software or the controllable logic, the operations of the MS 100, such as receiving a signal, receiving the command from the network, normal SACCH mode, sending of SACCH messages, entering the rescue mode, sending of truncated SACCH messages. Various operations and means are described in the examples of FIGS. 1-5.

Still referring to the FIG. 6, alternatively, middleware or software implementation can be applied (not shown). The MS 100 can be a hand-held device with various accessories such as a camera that the user can comfortable carry. Advantageously in a further embodiment, the receiver 100 can be a mobile phone.

Figure 7:
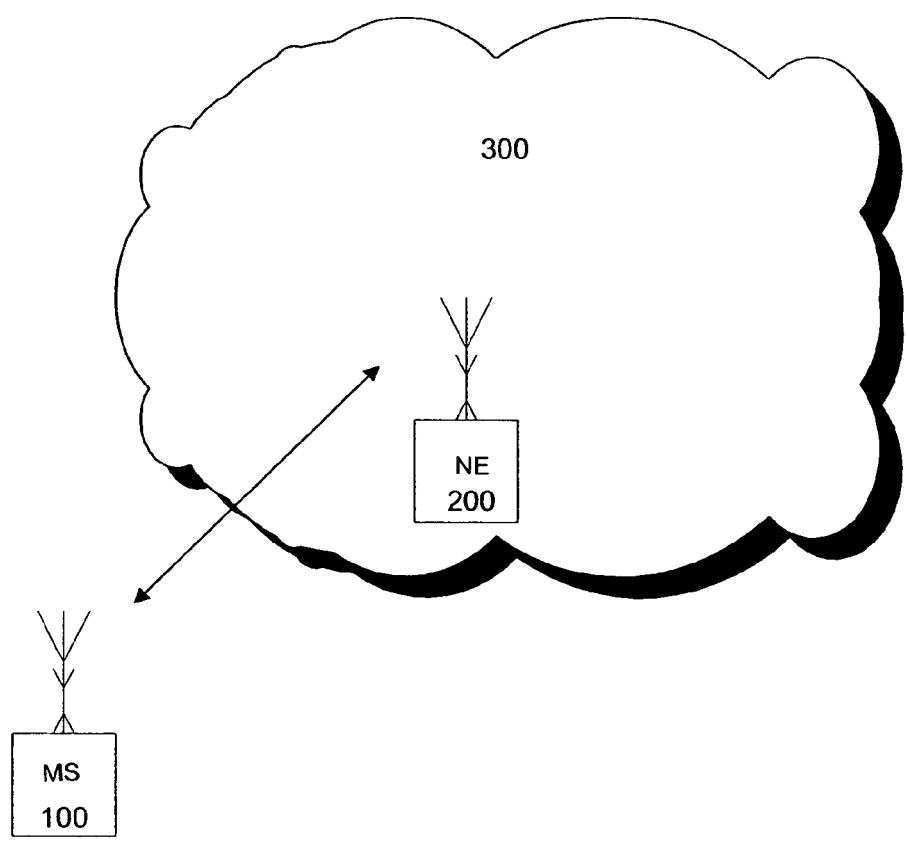
FIG. 7 depicts a general architecture of the system where some principles of the invention can be applied.

Various embodiments can be applied in the system of FIG. 7. The MS 100 operates preferably under coverage of a wireless cellular mobile network 300 applying e.g. GERAN. The network 300 comprises the NE 200 (and 200' (not shown)). Various operations and means of the MS and NE 200 and 200' with respect to the uplink and downlink are described in the examples of FIGS. 1-5.

In various further embodiments, the wireless cellular mobile network entity comprises a wireless cellular mobile network equipment or module. For example, the entity can be an entire BS, BSS or a module or sub-module of such a BS or BSS.

In still various further embodiments both the MS and the network should be capable of supporting the further embodiments. Otherwise interworking between products from different vendors would not necessary be possible.

The mobile and the network can support the various further embodiments even optionally. For example, upgrading is available for gradually entering the full appliance of the further embodiments. For example, spare bits can be used to signal the support of the embodiment. If both the MS and the BSS support embodiment, they can start using it. Network elements (or mobiles) that do not support embodiment can simply neglect these bits and use the normal SACCH only.

In the further embodiments when the RESCUE_MODE is activated, the sending and reception of SMS via the SACCH should be forbidden.

RAMIFICATIONS AND SCOPE

Although the description above contains many specifics, these are merely provided to illustrate embodiments and should not be construed as limitations of the scope of any embodiment. Thus it will be apparent to those skilled in the art that various modifications and variations can be made in the apparatuses and processes of the present embodiments without departing from the spirit or scope of the embodiments.

The invention claimed is:

1. A mobile station comprising:
a receiver configured to receive a command from a network entity, wherein the command indicates a communication mode of a connection, wherein the connection is based on adaptive multi-rate coding, and wherein the communication mode comprises a normal mode or a rescue mode, wherein the selected communication mode is a normal mode if the connection quality is acceptable, and wherein the selected communication mode is a rescue mode if the connection quality is unacceptable; and
a module configured to selectively utilize an adaptive associated control channel (ACCH) message of the connection for error correction based on the indicated communication mode, wherein the adaptive ACCH message is utilized only when the communication mode indicates the rescue mode.

2. The mobile station of claim 1, wherein the adaptive ACCH message comprises a truncated ACCH message.

3. The mobile station of claim 2, wherein the module is further configured to utilize extra bits of the truncated ACCH message for channel coding to maintain a tolerable error rate.

4. The mobile station of claim 2, wherein the truncated ACCH message omits reporting of weak neighboring cells.

5. The mobile station of claim 2, wherein channel coding of the truncated ACCH message is performed over more than four bursts.

6. The mobile station of claim 1, wherein the adaptive ACCH message is utilized when a threshold error rate is exceeded in a communication of a normal ACCH message.

7. The mobile station of claim 6, wherein if the threshold error rate is exceeded is determined by a radio link counter.

8. The mobile station of claim 6, wherein if the threshold error rate is exceeded is determined by a command mode request of the adaptive multi-rate coding.

9. The mobile station of claim 1, wherein the adaptive ACCH message has a fixed length.

10. The mobile station of claim 1, wherein the adaptive ACCH message comprises a fixed message content, and wherein the fixed message content indicates bits for channel coding.

11. The mobile station of claim 1, wherein the adaptive ACCH message comprises a header configured to indicate content of the adaptive ACCH message.

12. The mobile station of claim 11, wherein the content is selected based on a time delay from a last successful message or urgency of the content.

13. The mobile station of claim 1, wherein the adaptive ACCH message is a slow ACCH message, and wherein the slow ACCH message is encoded over at least two normal ACCH periods.

14. The mobile station of claim 13, wherein the normal ACCH period is 480 ms, and wherein the slow ACCH message is encoded in at least eight bursts.

15. The mobile station of claim 1, wherein the adaptive ACCH message is a combination of a slow ACCH message and a truncated ACCH message.

16. The mobile station of claim 1, wherein the adaptive ACCH message comprises a dynamic ACCH message configured to adapt to a changed channel condition.

17. The mobile station of claim 1, wherein the module is further configured to selectively utilize a normal ACCH message if the communication mode indicates the normal mode.

18. The mobile station of claim 1, further comprising a transmitter configured to transmit the adaptive ACCH message.

19. A network entity comprising:
a detection module configured to detect a connection quality of an associated control channel, wherein the connection is based on adaptive multi-rate coding; and
a selection module configured to select a communication mode based on the connection quality, wherein the selected communication mode is configured to cause utilization of an adaptive associated control channel (ACCH) message of the connection for error correction if the connection quality is unacceptable, wherein the communication mode comprises a normal mode or a rescue mode, wherein the communication mode is a normal mode if the connection quality is acceptable, wherein the communication mode is a rescue mode if the connection quality is unacceptable and wherein the adaptive ACCH message is utilized only when the communication mode indicates the rescue mode.

20. The network entity of claim 19, wherein the detecting the connection quality comprises determining if an error rate of the associated control channel has exceeded a threshold.

21. The network entity of claim 20, wherein the error rate of the associated control channel has exceeded the threshold if a radio link counter goes below the threshold.

22. The network entity of claim 20, wherein the error rate of the associated control channel has exceeded the threshold if a command mode request of the adaptive multi-rate coding goes below the threshold.

23. The network entity of claim 19, wherein the adaptive ACCH message is a truncated ACCH message.

24. The network entity of claim 23, wherein the truncated ACCH message comprises at least an omission of power control information or an omission of an L2 frame.

25. The network entity of claim 19, further comprising a receiver configured to receive a signal of the associated control channel.

26. The network entity of claim 19, further comprising a transmitter configured to transmit the selected communication mode.

27. The network entity of claim 19, further comprising a transmitter configured to transmit the adaptive ACCH message.

28. The network entity of claim 19, wherein the adaptive ACCH message comprises a fixed message content, and wherein the fixed message content indicates bits for channel coding.

29. The network entity of claim 19, wherein the adaptive ACCH message comprises a header configured to indicate content of the adaptive ACCH message.

30. The network entity of claim 19, wherein the adaptive ACCH message is a slow ACCH message, and wherein the slow ACCH message is encoded over at least two normal ACCH periods.

31. The network entity of claim 29, wherein the normal ACCH period is 480 ms, and wherein the slow ACCH message is encoded in at least eight bursts.

32. A method for enhancing communications in a network, the method comprising:
    receiving a command at a receiver from a network entity, wherein the command indicates a communication mode of a connection, wherein the connection is based on adaptive multi-rate coding, wherein the communication mode comprises a normal mode or a rescue mode, wherein the communication mode is a normal mode if the connection quality is acceptable, and wherein the communication mode is a rescue mode if the connection quality is unacceptable; and
    utilizing, at a module, an adaptive associated control channel (ACCH) message of the connection for error correction based on the indicated communication mode, wherein the adaptive ACCH message is utilized only when the communication mode indicates the rescue mode.

33. The method of claim 32, wherein the adaptive ACCH message comprises a truncated ACCH message.

34. The method of claim 33, further comprising utilizing extra bits of the truncated ACCH message for channel coding to maintain a tolerable error rate.

35. The method of claim 33, wherein the truncated ACCH message omits reporting of weak neighboring cells.

36. The method of claim 32, wherein the adaptive ACCH message is utilized when a threshold error rate is exceeded in a communication of a normal ACCH message.

37. The method of claim 36, wherein if the threshold error rate is exceeded is determined by a radio link counter.

38. The method of claim 36, wherein if the threshold error rate is exceeded is determined by a command mode request of the adaptive multi-rate coding.

39. The method of claim 32, wherein the adaptive ACCH message comprises a fixed message content, and wherein the fixed message content indicates bits for channel coding.

40. The method of claim 32, wherein the adaptive ACCH message comprises a header configured to indicate content of the adaptive ACCH message.

41. The method of claim 32, wherein the adaptive ACCH message is a slow ACCH message, and wherein the slow ACCH message is encoded over at least two normal ACCH periods.

42. The method of claim 41, wherein the normal ACCH period is 480 ms, and wherein the slow ACCH message is encoded in at least eight bursts.

43. The method of claim 32, further comprising selectively utilizing a normal ACCH message if the communication mode indicates the normal mode.

44. The method of claim 32, further comprising transmitting the adaptive ACCH message via a transmitter.

45. A method for enhancing communications in a network, the method comprising:
    detecting a connection quality of an associated control channel via a detection module of a network entity, wherein the connection is based on adaptive multi-rate coding; and
    selecting a communication mode based on the connection quality via a selection module of the network entity, wherein the selected communication mode is configured to cause utilization of an adaptive associated control channel (ACCH) message of the connection for error correction if the connection quality is unacceptable, wherein the communication mode comprises a normal mode or a rescue mode, wherein the communication mode is a normal mode if the connection quality is acceptable, wherein the communication mode is a rescue mode if the connection quality is unacceptable, and wherein the adaptive ACCH message is utilized only when the communication mode indicates the rescue mode.

46. The method of claim 45, wherein the detecting the connection quality comprises determining if an error rate of the associated control channel has exceeded a threshold.

47. The method of claim 46, wherein the error rate of the associated control channel has exceeded the threshold if a radio link counter goes below the threshold.

48. The method of claim 46, wherein the error rate of the associated control channel has exceeded the threshold if a command mode request of the adaptive multi-rate coding goes below the threshold.

49. The method of claim 45, wherein the adaptive ACCH message is a truncated ACCH message.

50. The method of claim 45, further comprising receiving a signal of the associated control channel via a receiver.

51. The method of claim 45, further comprising transmitting the selected communication mode via a transmitter.

52. The method of claim 45, wherein the adaptive ACCH message is a slow ACCH message, and wherein the slow ACCH message is encoded over at least two normal ACCH periods.

53. A network system comprising:
    a network entity including:
        a detection module configured to detect a connection quality of an associated control channel, wherein the connection is based on adaptive multi-rate coding; and
        a selection module configured to select a communication mode based on the connection quality, wherein the selected communication mode is configured to cause utilization of an adaptive associated control channel (ACCH) message of the connection for error correction if the connection quality is unacceptable, wherein the communication mode comprises a normal mode or a rescue mode, wherein the adaptive ACCH message is utilized only when the communication mode indicates the rescue mode, wherein the communication mode is a normal mode if the connection quality is acceptable, and wherein the communication mode is a rescue mode if the connection quality is unacceptable; and
    a mobile station including:
        a receiver configured to receive a command from the network entity, wherein the command indicates the selected communication mode of the connection; and
        a module configured to selectively utilize the adaptive ACCH message of the connection for error correction based on the selected communication mode.

* * * * *